US012213583B2

(12) United States Patent
Itzkowitz et al.

(10) Patent No.: US 12,213,583 B2
(45) Date of Patent: Feb. 4, 2025

(54) JUICER BRUSH AND CLEANING METHOD AND JUICER INCORPORATING REMOVABLE JUICER BRUSH

(71) Applicant: The Steelstone Group LLC, Brooklyn, NY (US)

(72) Inventors: Binyumen Itzkowitz, Brooklyn, NY (US); Meilech Friedman, Brooklyn, NY (US); Joseph Deutsch, Brooklyn, NY (US); Kalman Wertzberger, Brooklyn, NY (US); Robyn De Luca, Queens, NY (US); Wenhui Huang, Brooklyn, NY (US)

(73) Assignee: The Steelstone Group LLC, Brooklyn, NY (US)

( * ) Notice: Subject to any disclaimer, the term of this patent is extended or adjusted under 35 U.S.C. 154(b) by 370 days.

(21) Appl. No.: 17/579,032

(22) Filed: Jan. 19, 2022

(65) Prior Publication Data

US 2022/0225753 A1 Jul. 21, 2022

Related U.S. Application Data

(60) Provisional application No. 63/139,002, filed on Jan. 19, 2021.

(51) Int. Cl.
*A46B 9/02* (2006.01)
*A23N 1/02* (2006.01)
*A46B 3/00* (2006.01)

(52) U.S. Cl.
CPC ............. *A46B 9/02* (2013.01); *A23N 1/02* (2013.01); *A46B 3/005* (2013.01)

(58) Field of Classification Search
CPC .... A46B 9/02; A46B 9/00; A46B 9/08; A46B 2200/3006; A46B 2200/3033;
(Continued)

(56) References Cited

U.S. PATENT DOCUMENTS 4,813,091 A * 3/1989 Glasener ................. B08B 1/00
D4/130
10,349,730 B2 7/2019 Ye
(Continued)

FOREIGN PATENT DOCUMENTS

CN 201470498 U 5/2010
CN 204913816 U 12/2015
(Continued)

OTHER PUBLICATIONS

First Office Action with Search Report issued by the Chinese Patent Office for Chinese Patent Application No. 202280000184.4, dated Feb. 28, 2024, with partial English translation attached.
(Continued)

*Primary Examiner* — David S Posigian
*Assistant Examiner* — Tyler James McFarland
(74) *Attorney, Agent, or Firm* — Myers Wolin, LLC

(57) ABSTRACT

A brush is provided for cleaning a blade and mesh basket of a juicer. The brush may have a brush body having a horizontal base component and a first outer brushing surface angled relative to the horizontal base component. The horizontal base component extends laterally from the first outer brushing surface, and a groove is provided in an upper surface of the brush body, the groove arranged perpendicular to the horizontal base component. The groove is located at a transition between the horizontal base component and the first outer brushing surface. Bristles extend from the first outer brushing surface. Also provided is a juicer with a removable brush for use in a cleaning process and a method for cleaning a juicer using a removable brush.

17 Claims, 14 Drawing Sheets

(58) Field of Classification Search
CPC ..... A46B 5/0004; A46B 5/0012; A47L 17/00;
A47L 17/04; A47L 25/00; A23N 1/00;
A47J 31/60
USPC .................................. D4/119; 15/159.1–160
See application file for complete search history.

(56) References Cited

U.S. PATENT DOCUMENTS

| | | | |
|---|---|---|---|
| 2005/0246857 | A1 | 11/2005 | Omoto et al. |
| 2007/0056129 | A1 | 3/2007 | Bohannon |
| 2008/0314261 | A1 | 12/2008 | Hensel |
| 2015/0164129 | A1 | 6/2015 | Kim |
| 2016/0255947 | A1* | 9/2016 | Ye .............................. B08B 1/12 |

FOREIGN PATENT DOCUMENTS

| | | |
|---|---|---|
| CN | 105853005 A | 8/2016 |
| CN | 110025126 A | 7/2019 |
| CN | 210249514 U | 4/2020 |
| JP | S48107662 U | 12/1973 |
| JP | S5018789 U | 3/1975 |
| JP | S59186508 A | 10/1984 |
| JP | 2006158917 A | 6/2006 |
| JP | 3152717 U | 8/2009 |
| KR | 20170138731 A | 12/2017 |
| KR | 2163158 B1 | 10/2020 |
| KR | 102163158 B1 | 10/2020 |
| WO | 2006128221 A1 | 12/2006 |
| WO | 2014003447 A1 | 1/2014 |

OTHER PUBLICATIONS

International Search Report and Written Opinion issued by the Russian Federal Institute of Industrial Property for International Patent Application No. PCT/US2022/012765, mailed Apr. 21, 2022.
Non-final Office Action issued by the Japanese Patent Office for Japanese Patent Application No. 2023-543375, dated May 7, 2024.
Second Office Action issued by the Chinese Patent Office for Chinese Patent Application No. 202280000184.4, dated May 14, 2024.
European search report issued by The European Patent Office for European Patent Application No. 22743033, dated Sep. 10, 2024.

* cited by examiner

JUICER BRUSH AND CLEANING METHOD AND JUICER INCORPORATING REMOVABLE JUICER BRUSH

CROSS-REFERENCE TO RELATED APPLICATIONS

This application claims the benefit of U.S. application Ser. No. 63/139,002, filed Jan. 19, 2021, the contents of which are incorporated herein by reference.

FIELD

The present disclosure generally relates to brushes for cleaning juicers, methods for cleaning a juicer using a brush, and juicers incorporating removable juicer brushes.

BACKGROUND

Juicers are generally difficult to clean. As one example, a typical centrifugal juicer utilizes a spinning blade to cut or shred fruits and vegetables into small pieces, which then transition to a chamber where centrifugal force separates the juice from the pulp by compressing the fruit against a perforated or mesh basket.

Fruits and vegetables are provided to the spinning blade by a chute, which is typically substantially cylindrical, and may be forced against the blade using a plunger configured to fit into the chute. Once the produce being juiced has been cut or shredded to a point where it is sufficiently small to fit through an opening, such as a space between the chute and the blade, it transfers to a mesh segment of the basket where it is strained using centrifugal force.

While this approach may quickly and easily strain fruit juice from pulp, the mesh of the basket quickly collects pulp and other fruit waste, and therefore requires frequent cleaning. Such cleaning may be required after every use, for example, and the blade and basket assembly may be difficult to disassemble for cleaning and may be an awkward shape to clean.

There is a need for a brush that can efficiently clean a blade and mesh basket of a juicer, as well as for juicers incorporating such a brush and for a method for cleaning a juicer using such a brush.

SUMMARY

In order to efficiently clean a blade and mesh basket of a juicer, a brush may be provided.

Accordingly, a brush may have a brush body having a horizontal base component and a first outer brushing surface angled relative to the horizontal base component. The horizontal base component extends laterally from the first outer brushing surface, and a groove is provided in an upper surface of the brush body, the groove arranged perpendicular to the horizontal base component. The groove is located at a transition between the horizontal base component and the first outer brushing surface. A plurality of bristles extend from the first outer brushing surface.

In some embodiments, the groove forms an arc, and the first outer brushing surface defines a segment of a surface of a truncated cone. The truncated cone and the arc are then centered about an identical central axis.

In some such embodiments, a second outer brushing surface may be provided opposite the horizontal base component from the first outer brushing surface. The secondary outer brushing surface defines a second segment of the surface of the truncated cone.

In some such embodiments, a secondary groove is provided perpendicular to the horizontal base component and located at a transition between the horizontal base component and the secondary outer brushing surface. The secondary groove forms an arc centered about the central axis. A notch may then be provided extending from the groove or the secondary groove in the direction of the horizontal base component.

In some embodiments with only a single groove a notch may similarly be provided extending from the groove in the direction of the horizontal base component.

In some embodiments, a plurality of bristles may extend from a bottom surface of the horizontal base component.

In some embodiments, a secondary horizontal base surface is provided above a lower surface of the horizontal base component and adjacent the first outer brushing surface. A plurality of bristles may then be provided extending from the secondary horizontal base surface.

In some embodiments, bristles may extend from the first outer brushing surface in a direction perpendicular to the first outer brushing surface. In other embodiments, the bristles may extend from the first outer brushing surface in a direction parallel to the groove.

Also provided is a juicer having a brush for cleaning a blade and mesh basket. Such a juicer includes a bowl having a substantially circular flat bottom and mesh walls defining a truncated cone extending from the flat bottom. The juicer also has a blade located at the flat bottom of the bowl, a substantially cylindrical vertical chute terminating above the blade, and a removable brush.

The brush has a brush body having a horizontal base component and a first outer brushing surface angled relative to the horizontal base component. The horizontal base component extends laterally from the first outer brushing surface and has a slope angle substantially identical to a slope angle of the mesh walls.

The brush may then have a groove in an upper surface of the brush body, with the groove arranged perpendicular to the horizontal base component and forming an arc of a circle having a circumference substantially identical to that of an end of the vertical chute. The end of the vertical chute then mates with the arc.

The groove is located at a transition between the horizontal base component and the first outer brushing surface. A plurality of bristles are then provided extending from the first outer brushing surface, and during use, either with or without the brush, the bowl rotates relative to the vertical chute.

In some embodiments, the first outer brushing surface defines a segment of a surface of a truncated cone. The truncated cone of the first outer brushing surface, the truncated cone of the mesh walls of the bowl, and the circumference of the end of the vertical chute are then centered about a single central axis when the removable brush is mated with the vertical chute.

In some such embodiments, the removable brush further comprises a secondary outer brushing surface opposite the horizontal base component from the first outer brushing surface. The secondary outer brushing surface then defines a second segment of the surface of the truncated cone of the first outer brushing surface.

In some such embodiments, the brush further comprises a secondary groove perpendicular to the horizontal base component and located at the transition between the horizontal base component and the secondary outer brushing surface.

The secondary groove then forms an arc centered about the single central axis and mates with the end of the vertical chute.

In some embodiments, the brush further comprises a notch extending from the groove towards the horizontal base component. The end of the vertical chute may then comprise a protrusion extending from the circumference of the end of the vertical chute. The protrusion then mates with the notch when the brush is mated with the end of the vertical chute.

In some embodiments, the brush further comprises a plurality of bristles extending from a bottom surface of the horizontal base component.

In some embodiments, a secondary horizontal base surface is provided above a lower surface of the horizontal base component and adjacent the first outer brushing surface. A plurality of bristles may then be provided extending from the secondary horizontal base surface.

In some embodiments, bristles may extend from the first outer brushing surface in a direction perpendicular to the first outer brushing surface. In other embodiments, the bristles may extend from the first outer brushing surface in a direction parallel to the groove.

Also provided is a method for cleaning a juicer. Such a method may include removing a juicer cover from a juicer chamber. The juicer cover may comprise a substantially cylindrical vertical chute and the juicer chamber may comprise a bowl having a substantially circular flat bottom and mesh walls defining a truncated cone extending from the flat bottom.

A removable brush may then be provided, where the removable brush has a brush body having a horizontal base component and a first outer brushing surface angled relative to the horizontal base component. The removable brush also has a groove in an upper surface of the brush body, the groove arranged perpendicular to the horizontal base component and forming an arc of a circle having a circumference substantially identical to that of an end of the vertical chute.

The removable brush may also have a notch extending from the groove towards the horizontal base component. The method may then include mating the groove to the vertical chute by locating the end of the vertical chute at least partially within the groove and aligning the notch with a protrusion from the circumference of the end of the vertical chute.

The vertical chute is then located such that it shares a vertical axis with the mesh walls of the bowl, and the juicer cover is fixed relative to the juicer chamber. The method then further includes pouring a fluid into the vertical chute while rotating the bowl relative to the vertical chute.

DETAILED DESCRIPTION OF THE PREFERRED EMBODIMENTS

Figure 1:
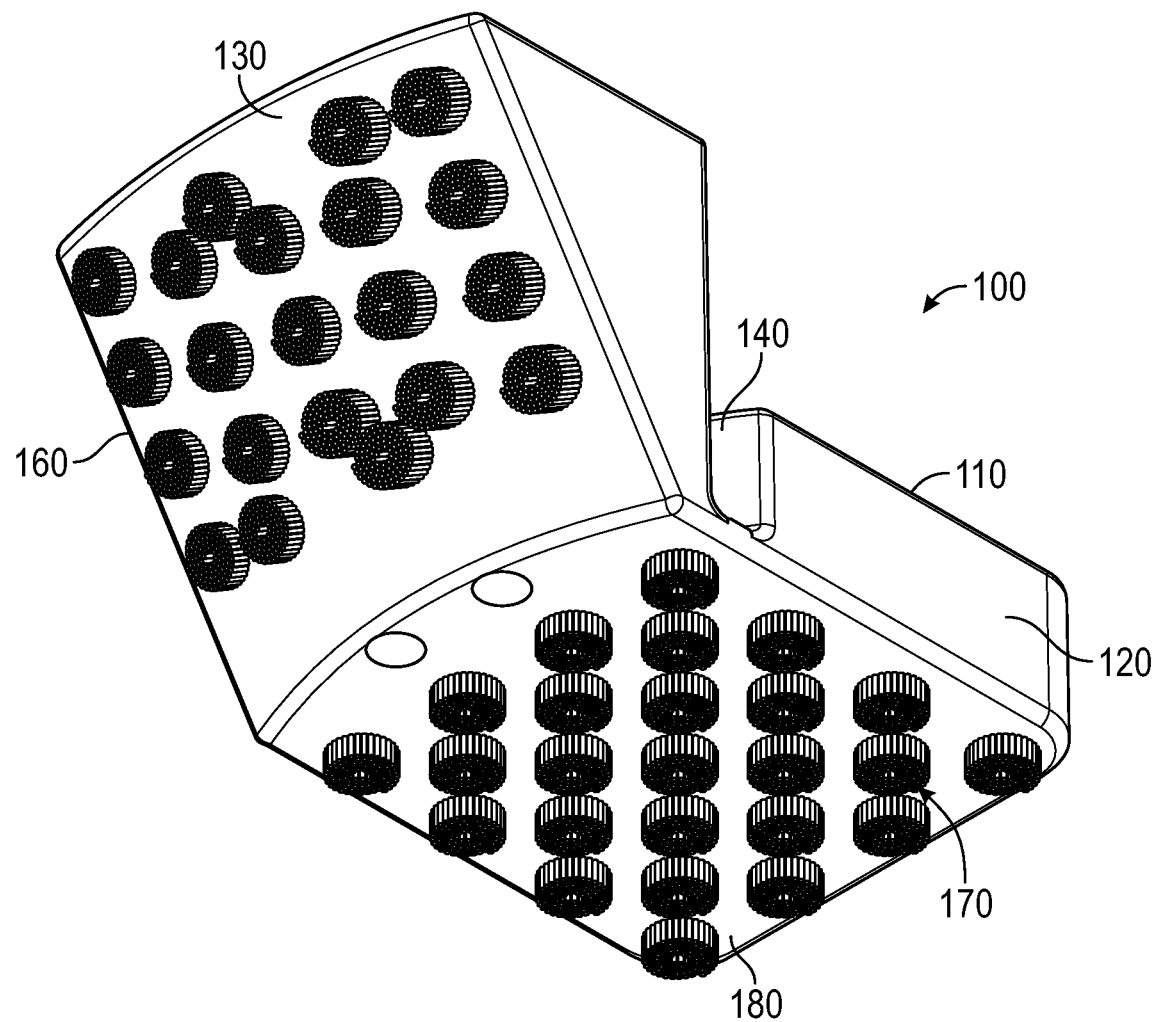
FIG. 1 shows a lower perspective view of a brush in accordance with this disclosure.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Figure 2:
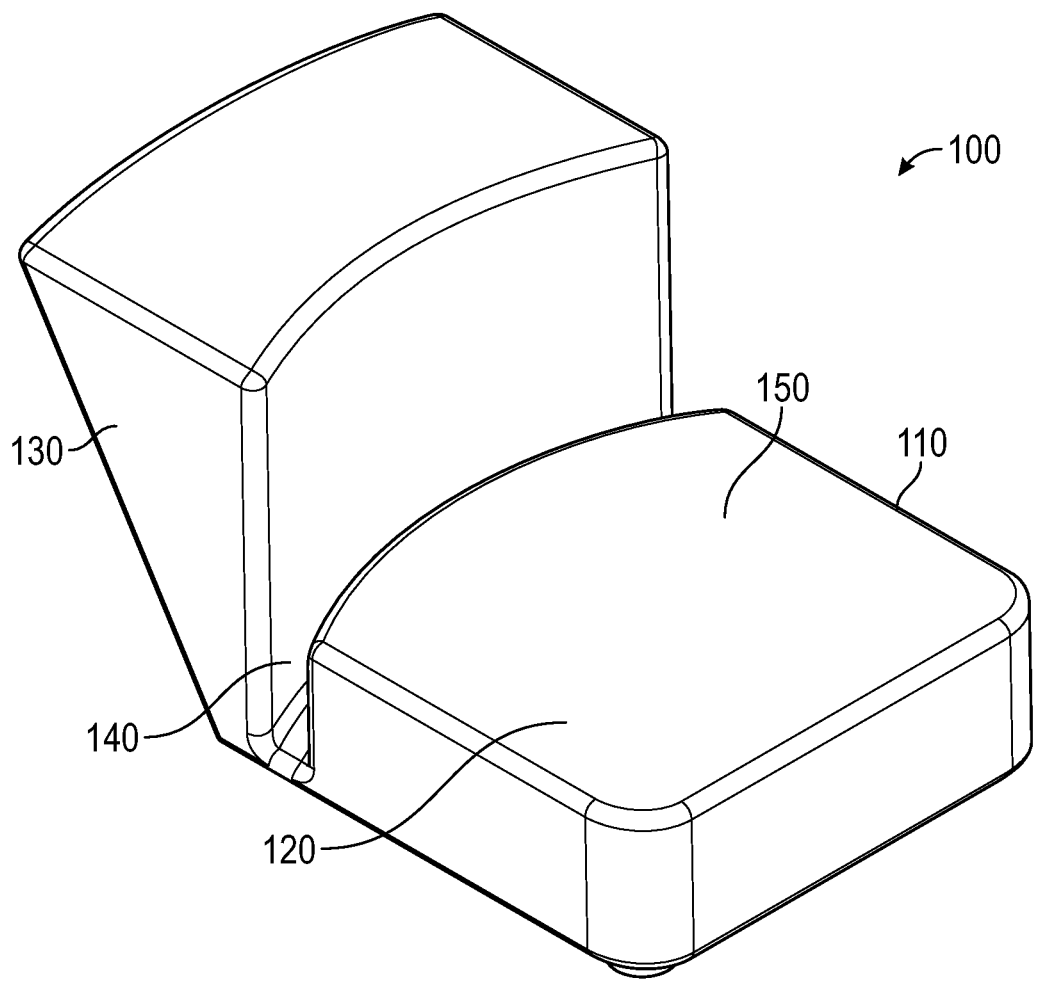
FIG. 2 shows an upper perspective view of the brush of FIG. 1.
Figure 3:
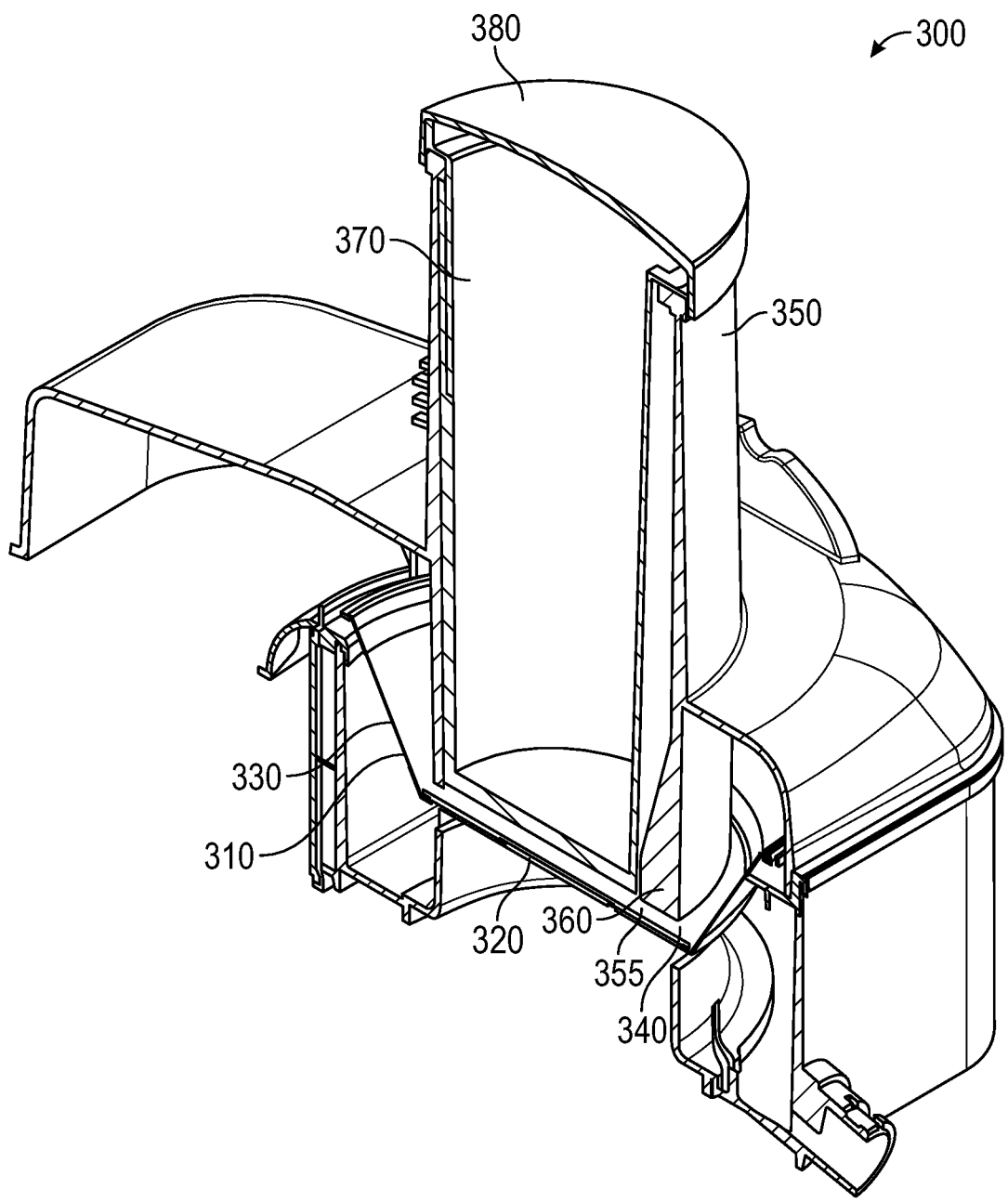
FIG. 3 shows a sectioned perspective view of a juicer in accordance with this disclosure.
Figure 4:
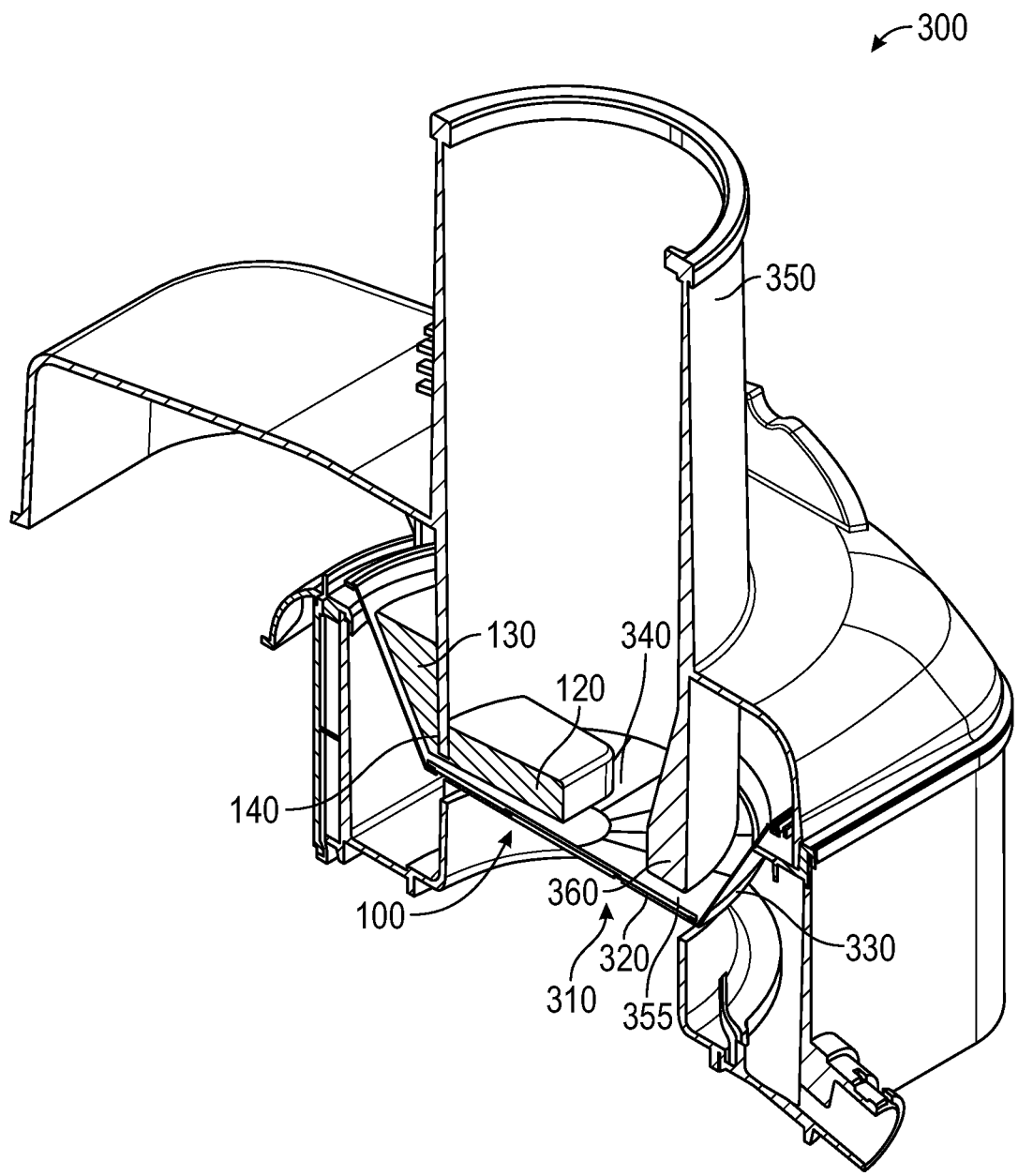
FIG. 4 shows a sectioned perspective view of the juicer of FIG. 3 with the brush of FIG. 1.

FIGS. 1 and 2 shows perspective views of a brush 100 in accordance with this disclosure. FIG. 3 shows a sectioned perspective view of a juicer 300 in accordance with this disclosure. FIG. 4 shows a sectioned perspective view of the juicer 300 of FIG. 3 with the brush 100 of FIG. 1.

Figure 5:
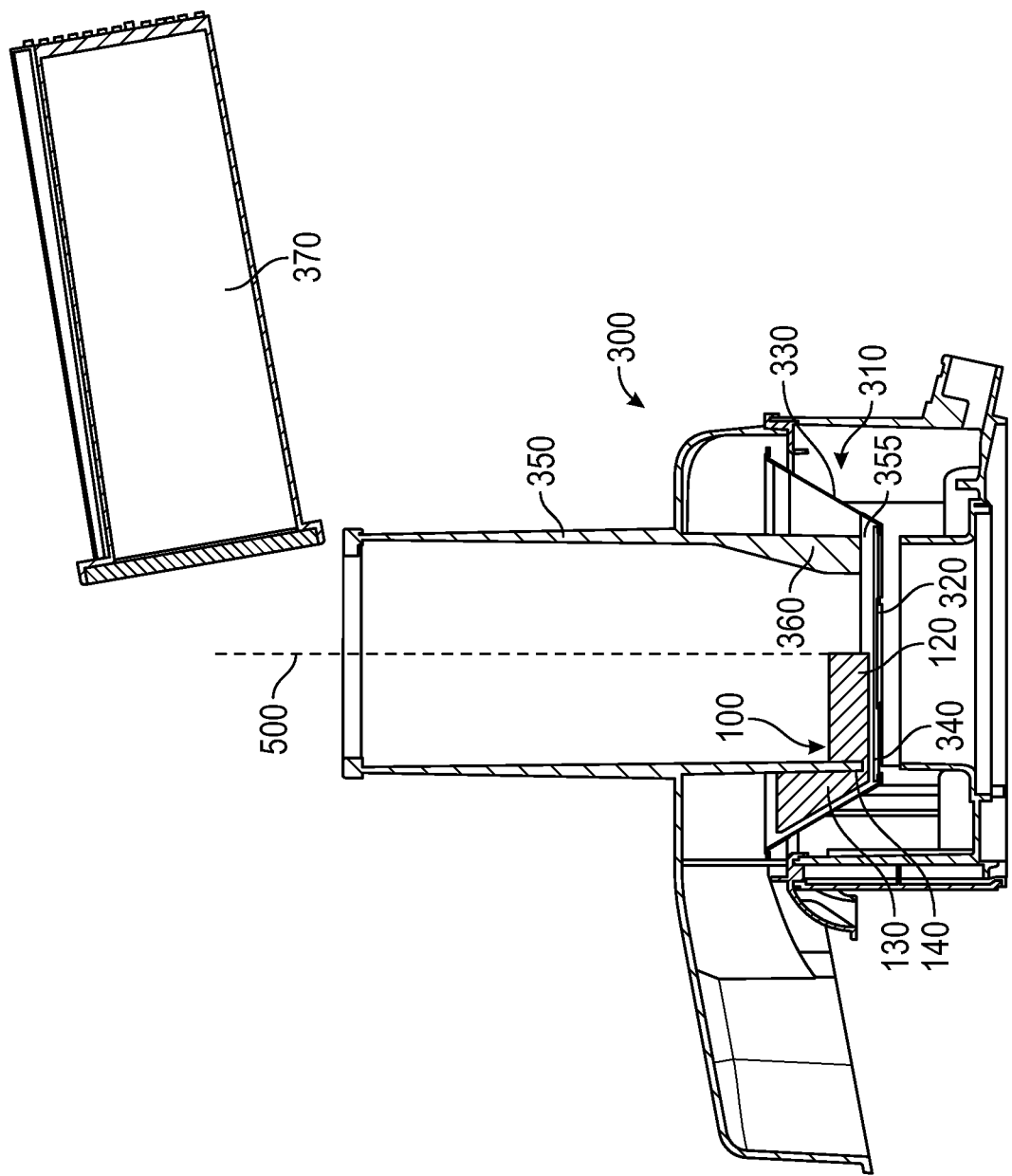
FIG. 5 shows a sectioned view of the juicer of FIG. 3 and the brush of FIG. 1 used in a cleaning method.

FIG. 1 shows a brush 100 for cleaning a juicer 300. Typically, the brush 100 shown is removable from a juicer 300 being cleaned, such that during use as a juicer, the brush is not present, and the brush is then inserted for use in a cleaning method. FIG. 5 shows a sectioned view of the juicer 300 of FIG. 3 and the brush 100 of FIG. 1 used in a cleaning method, discussed in more detail below.

As shown, the brush 100 has a brush body 110 having a horizontal base component 120 and a first outer brushing surface 130 angled relative to the horizontal base component. The horizontal base component 120 extends laterally from the first outer brushing surface 130.

As shown, the brush 100 also includes multiple bristles 160 extending from the first outer brushing surface 130. In some embodiments, additional bristles 170 extend from a bottom surface 180 of the horizontal base component 120.

The brush 100 also has a groove 140 in an upper surface 150 of the brush body 110, the groove arranged perpendicular to the horizontal base component 120. The groove 140 is typically located at a transition between the horizontal base component 120 and the first outer brushing surface 130.

Typically, the groove 140 forms an arc, as shown. Similarly, the first outer brushing surface 130 also forms an arc, when viewed from above or below, and therein defines a segment of a surface of a truncated cone. The truncated cone of the first outer brushing surface 130 and the arc of the groove 140 are centered about an identical central axis 500, 1000 most clearly visible in FIGS. 5 and 10B.

FIG. 3 shows a juicer 300 for use with the brush 100 of FIG. 1, FIG. 4 shows the juicer 300 with the brush incorporated, and FIG. 5 shows the juicer 300 during a cleaning cycle. As shown, the juicer 300 has a bowl 310 having a substantially circular flat bottom 320 and mesh walls 330 defining a truncated cone extending from the flat bottom.

The juicer 300 further includes a blade 340 located at the flat bottom 320 of the bowl 310. A substantially cylindrical vertical chute 350 extends downward into the bowl 310 and terminates above the blade 340, leaving a small gap 355 between an end 360 of the vertical chute 350 and the flat bottom 320 of the bowl.

During use, the blade 340 rotates with the bowl 310, thereby chopping any produce that is inserted into the vertical chute 350. Once the produce has been chopped sufficiently finely, it passes through the small gap 355 between the end 360 of the vertical chute 350 and the flat bottom 320 of the still rotating bowl 310 and is pressed against the conical mesh walls 330 by centrifugal force of the rotation, thereby straining fruit juice through the mesh walls.

During a cleaning routine, the juicer 300 is opened and the removable brush 100 is inserted. During insertion, the groove 140 of the removable brush 100 is mated with the end 360 of the vertical chute 350. The arc of the groove 140 typically corresponds to the circumference of the end 360 of the vertical chute 350 such that the components are mated by simply inserting the end of the vertical chute into the groove.

The juicer 300 is then closed with the brush 100 fitted to the end 360 of the vertical chute 350. As shown, and as discussed above, the first outer brushing surface 130 is angled relative to the horizontal base 120 and defines a segment of a truncated cone. A slope angle of the first outer brushing surface 130 is substantially identical to a slope angle of the mesh walls 330 of the bowl 310. When inserted into the juicer 300 and mated with the vertical chute 350, the truncated cone of the first outer brushing surface 130 and the truncated cone of the mesh walls 330 of the bowl 310 share the single central axis 500 of the vertical chute 350.

The juicer 300 further includes a plunger 370. During typical use of the juicer 300, the plunger may be used to force produce down the vertical chute 350 such that it is forced against the blade 340. During the cleaning routine noted above, the plunger 370 may be used as a reservoir for water, or some other fluid, which is then poured into the vertical chute 350 while rotating the bowl 310 relative to the vertical chute. As such, the brush 100 cleans the bowl 310 while the fluid poured in lubricates the cleaning process. In some embodiments, the plunger 370 is provided with a lid 380 such that the plunger is closed during standard use of the juicer 300. In such embodiments, the lid 380 is removed so that the plunger 370 can be used as a reservoir.

Figure 6:
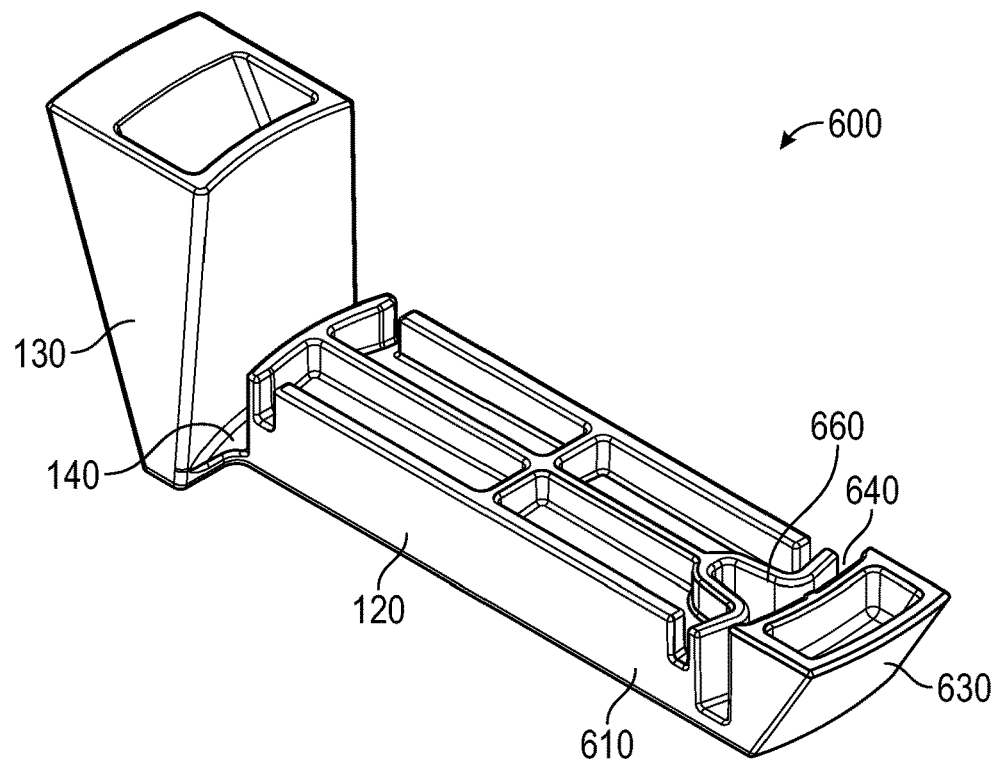
FIG. 6 shows an upper perspective view of a second embodiment of a brush in accordance with this disclosure.
Figure 7:
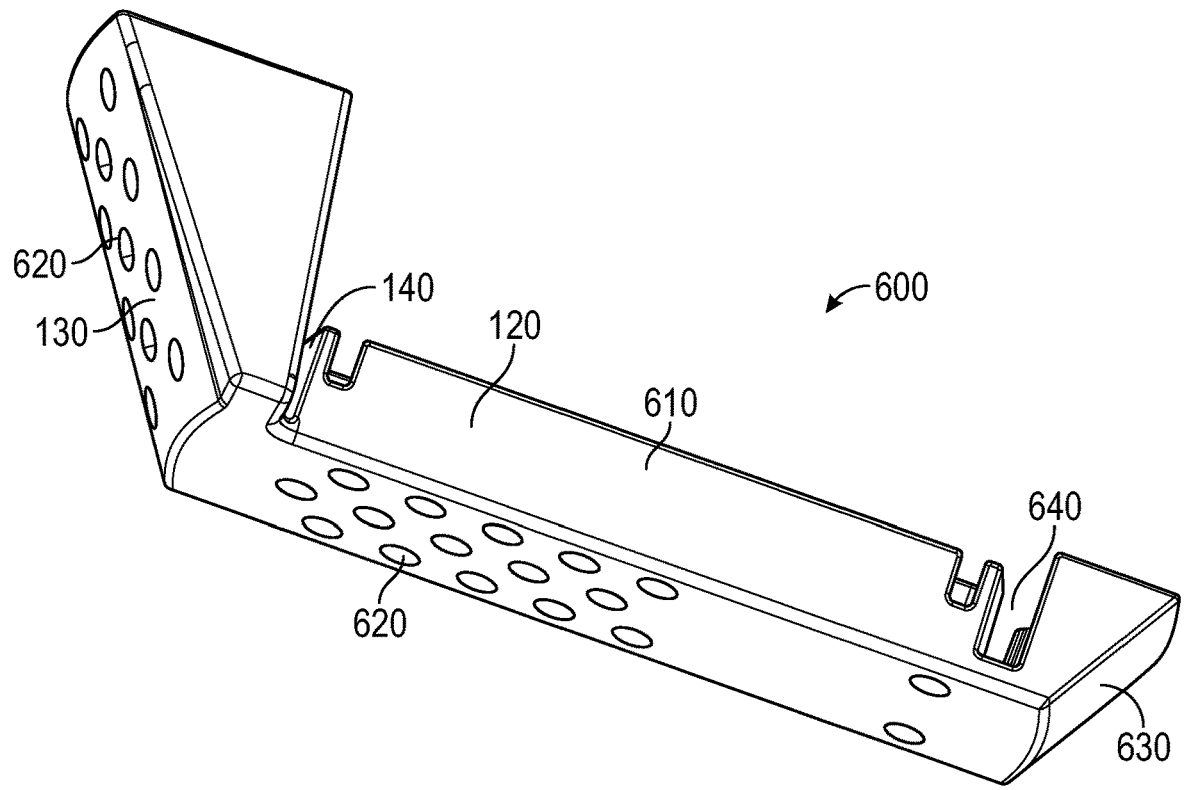
FIG. 7 shows a lower perspective view of the brush of FIG. 6.
Figure 8:
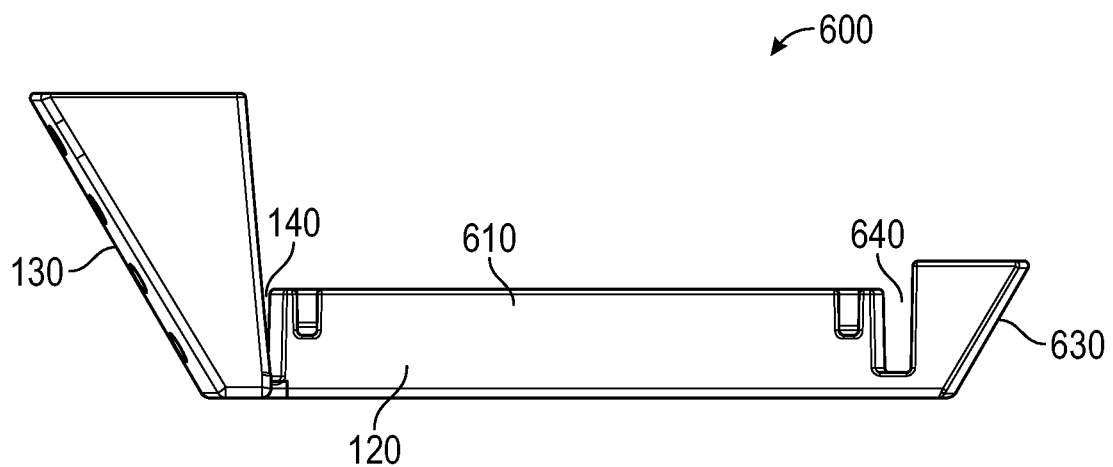
FIG. 8 shows a side view of the brush of FIG. 6.
Figure 9:
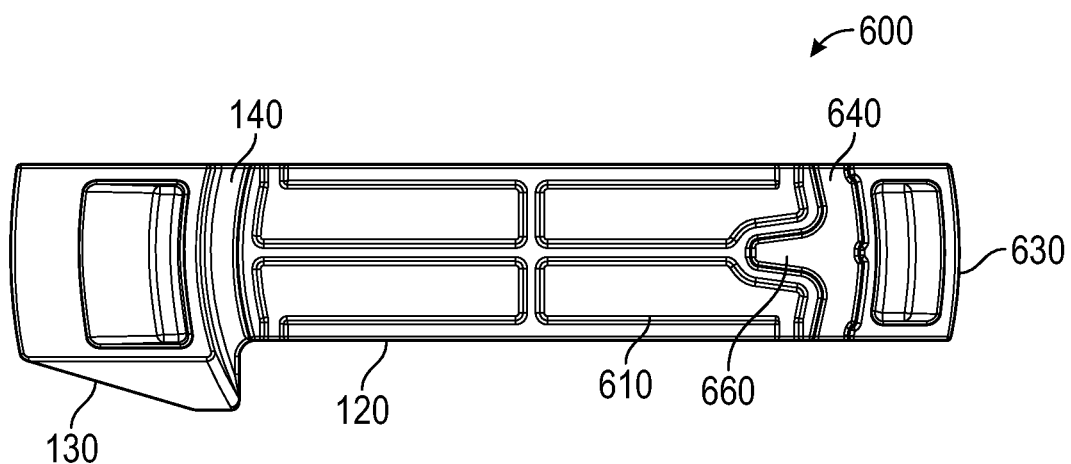
FIG. 9 shows a top view of the brush of FIG. 6.

FIG. 6 shows an upper perspective view of a second embodiment of a brush 600 in accordance with this disclosure. FIG. 7 shows a lower perspective view of the brush 600 of FIG. 6. FIGS. 8 and 9 show side and top views of the brush 600 of FIG. 6. To the extent that the brush 600 of FIG. 6 has components identical to those of the brush 100 of FIG. 1, the embodiments use the same reference numerals.

Figure 10A:
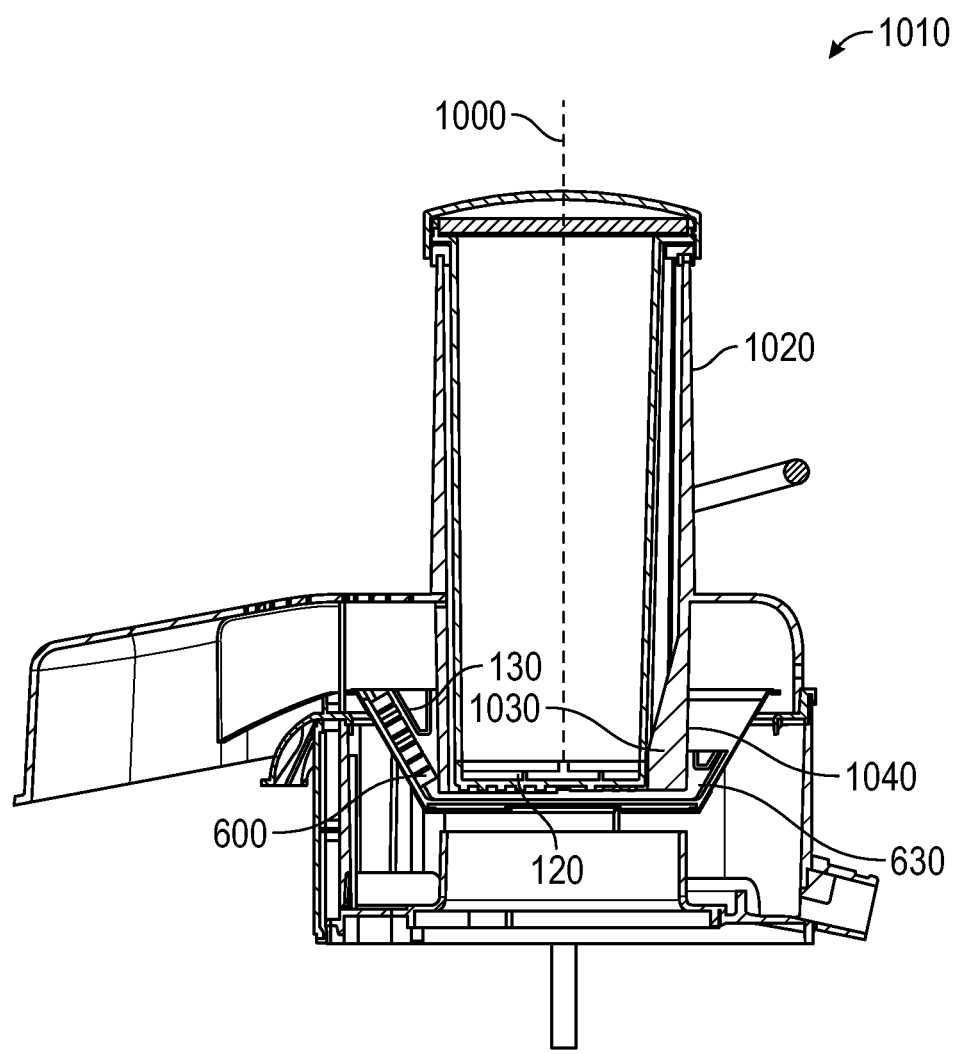
FIG. 10A shows a sectioned side view of a blender with the brush of FIG. 6.
Figure 10B:
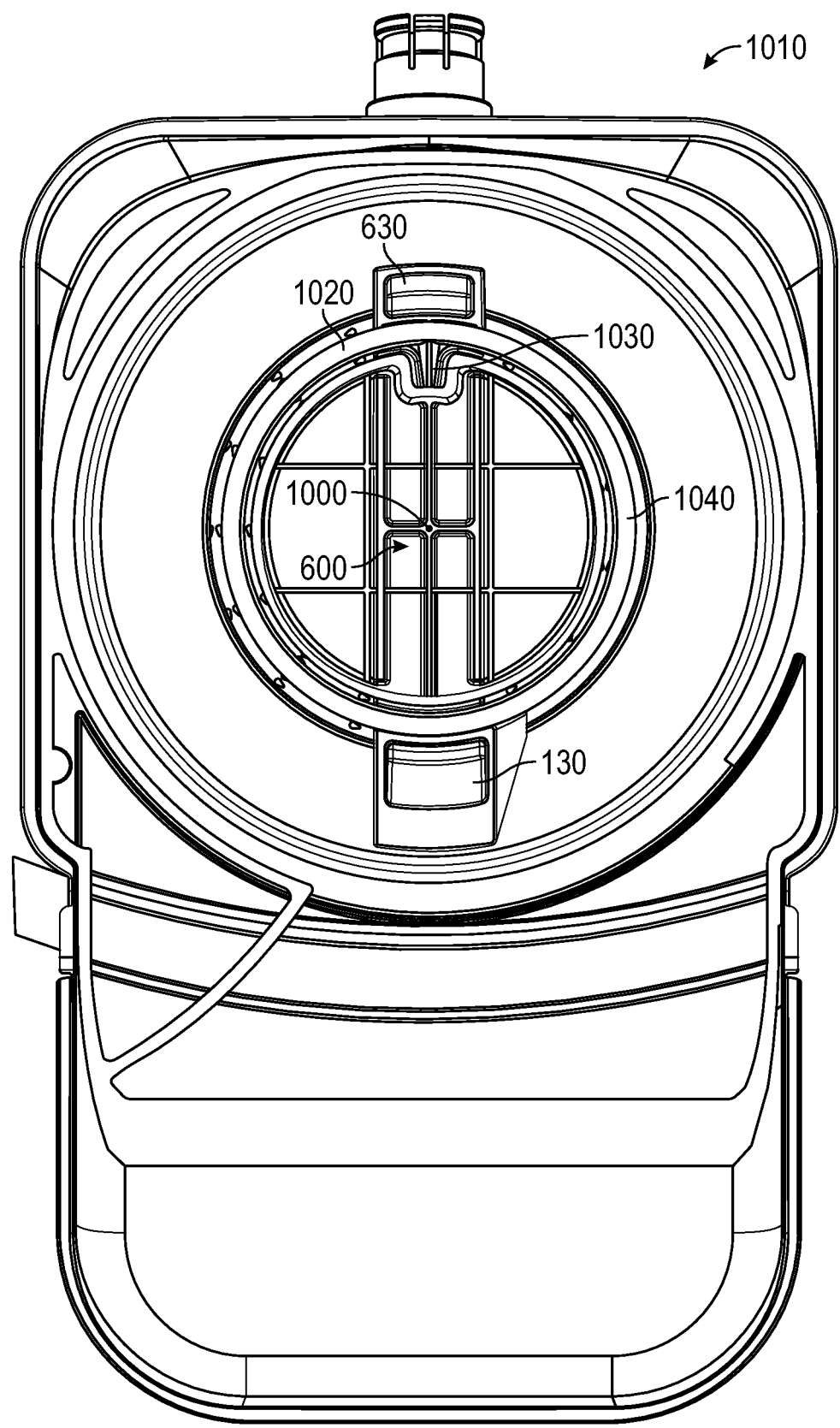
FIG. 10B shows a sectioned top view of the blender with the brush assembly of FIG. 10A.
Figure 10C:
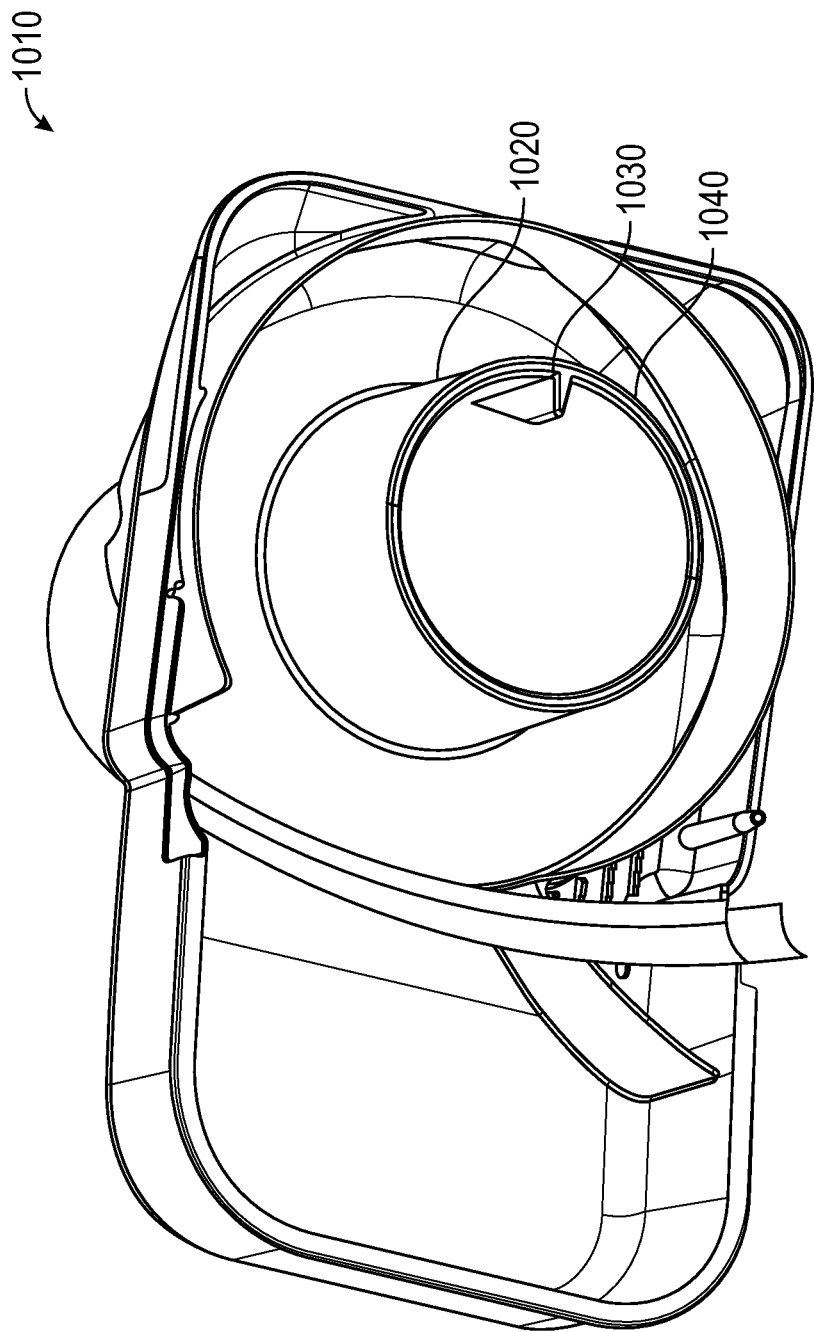
FIG. 10C shows a lower perspective view of a portion of the blender including a vertical chute.

FIG. 10A shows a sectioned side view of a blender 1010 with the brush 600 of FIG. 6. FIG. 10B shows a sectioned top view of the blender 1010 with the brush 600 of FIG. 10A. FIG. 10C shows a lower perspective view of a portion of the blender 1010 of FIG. 10A including a vertical chute 1020.

As shown, the brush 600 may have a brush body 610 further comprising a secondary outer brushing surface 630 opposite the horizontal base component 120 from the first outer brushing surface 130. The secondary outer brushing surface 630 would typically define a second segment of the surface of the same truncated cone as that of the first outer brushing surface 130. It is noted that in some embodiments, such as that shown in FIG. 6, the secondary brushing surface 630 does not contain bristles and functions primarily for stabilizing the brush 600 during use. In other embodiments, such as those shown in FIGS. 11 and 16, the secondary brushing surface 630 contains bristles and brushes the bowl of the juicer 300, 1000 during use. It is further noted that in the embodiments of FIGS. 6, 11, and 16, bristles are not shown, but openings 620 for bristles are provided. In use, bristles would typically be provided in some or all of the openings for bristles.

Further, the brush 600 may include a secondary groove 640 in the upper surface 150 of and perpendicular to the horizontal base component 120 and located at a transition between the horizontal base component and the secondary outer brushing surface 630. Accordingly, the secondary groove 640 is opposite the horizontal base component 120 from the first outer brushing surface 130. The secondary groove 640 may form an arc centered about the central axis 1000, and may thereby form an arc of the same circle as that of the first groove 140.

In some embodiments, the brush 100, 600 further comprises a notch 660 extending from one or both of the grooves 140, 640 in the direction of the horizontal base component. This notch 660 may interface with a protrusion 1030 extending from a circular end 1040 of the vertical chute 1020. As such, the circular end 1040 of the vertical chute 1020 may mate with the grooves 140, 640 of the brush 100, 600, and the notch 660 may mate with the protrusion 1030. During use, the brush 100, 600 is held stationary relative to the vertical chute 1020 and a bowl of the juicer 1010, and the interface of the notch 660 and the protrusion 1030 prevents the brush 100, 600 from rotating relative to the vertical chute 1020.

It is noted that the embodiment shown provides a notch 660 extending from the secondary groove 640 and a protrusion 1030 extending from the circular end 1040 of the vertical chute 1020. However, it is understood that the notch 660 may be provided in the first groove 140 in addition to or in place of the secondary groove 640. Similarly, the locating mechanism may be modified such that, for example, a notch is provided in the circular end 1040 of the vertical chute, and a discontinuity is provided in one or both of the grooves 140, 640 in order to mate with the notch.

Figure 11:
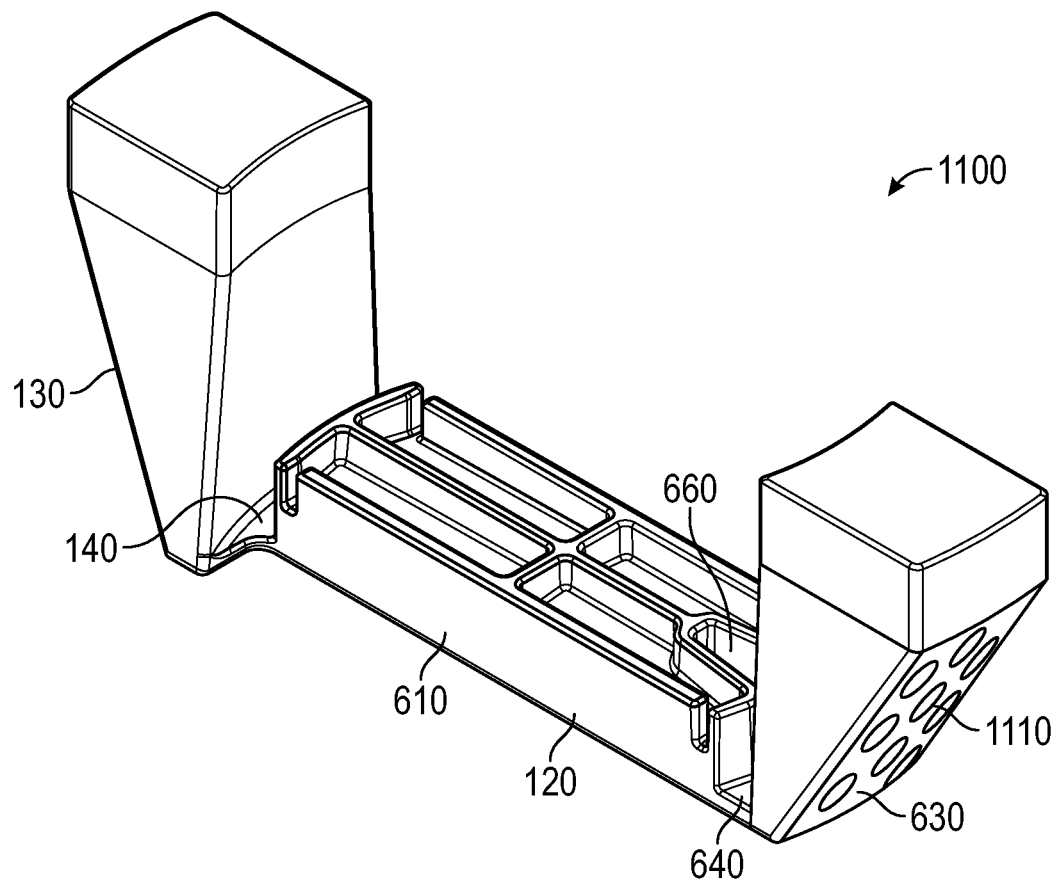
FIG. 11 shows an upper perspective view of a third embodiment of a brush in accordance with this disclosure.
Figure 12:
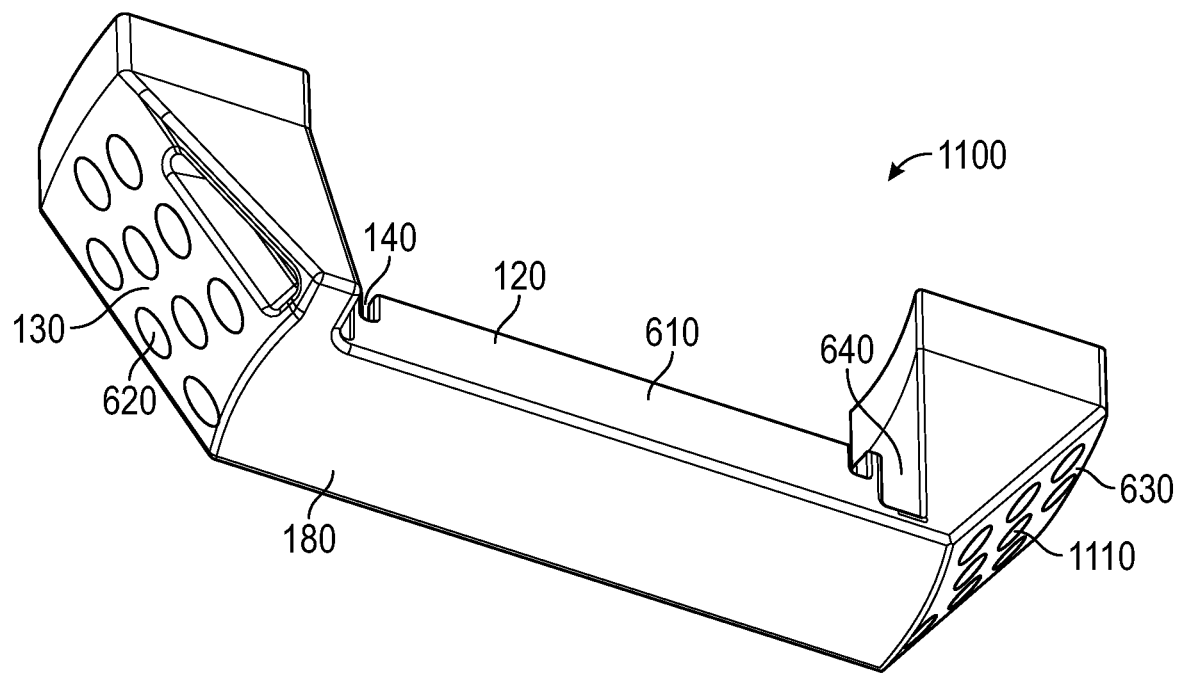
FIG. 12 shows a lower perspective view of the brush of FIG. 11.
Figure 13:
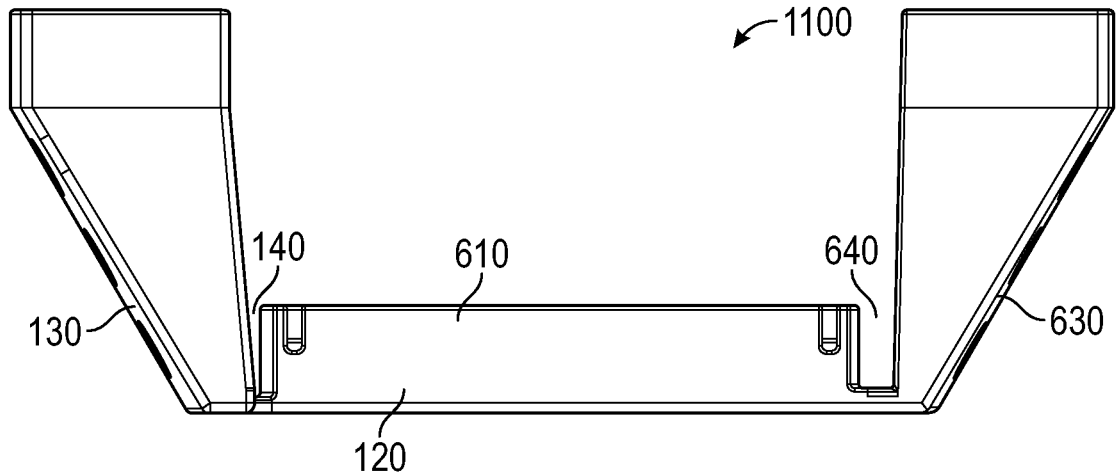
FIG. 13 shows a side view of the brush of FIG. 11.
Figure 14:
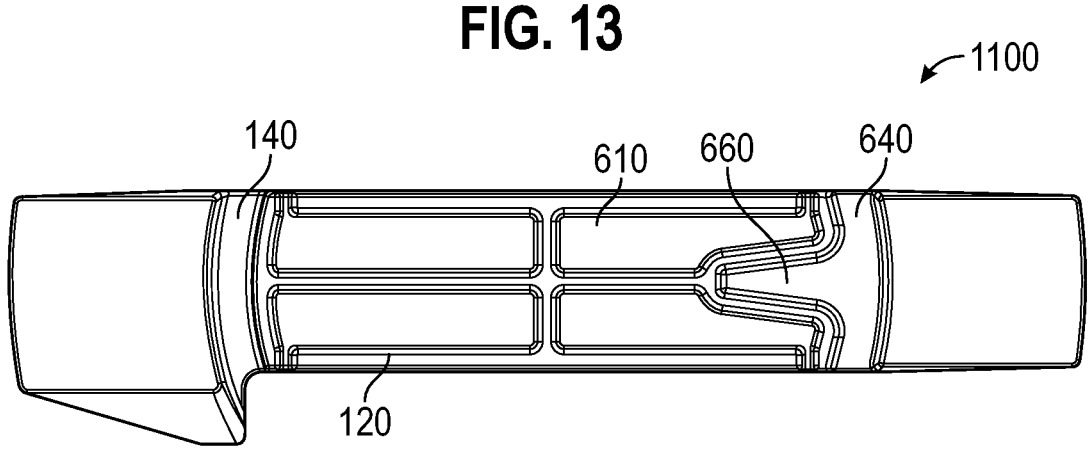
FIG. 14 shows a top view of the brush of FIG. 11.
Figure 15:
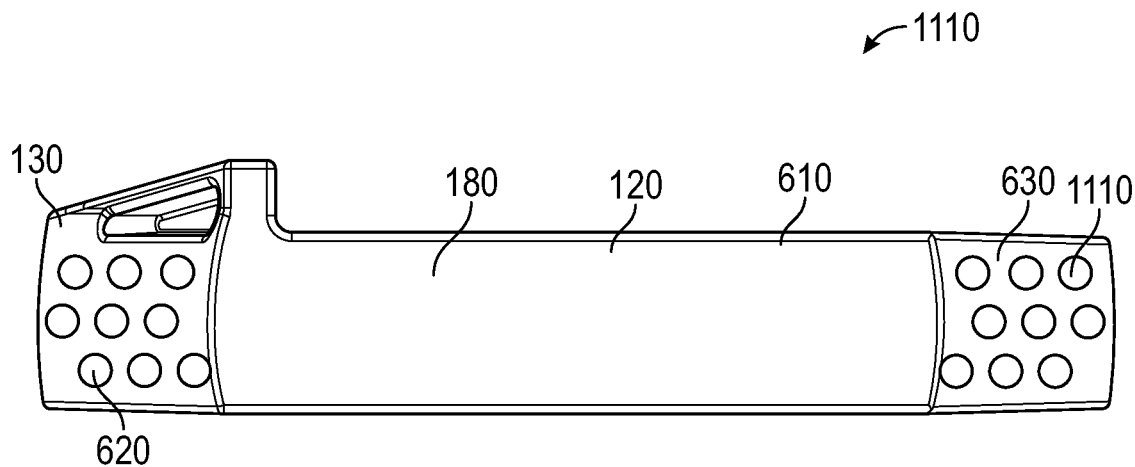
FIG. 15 shows a bottom view of the brush of FIG. 11.

FIG. 11 shows an upper perspective view of a third embodiment of a brush 1100 in accordance with this disclosure. FIG. 12 shows a lower perspective view of the brush 1100 of FIG. 11. FIG. 13 shows a side view of the brush 1100 of FIG. 11. FIG. 14 shows a top view and FIG. 15 shows a bottom view of the brush 1100 of FIG. 11.

The brush of FIG. 11 is similar to that shown above in FIG. 6, and is labeled using identical reference numerals for parallel features. As shown, the embodiment shown differs from those discussed above in that no bristles or bristle openings are provided on the bottom surface 180 of the horizontal base component 120.

Further, as shown, the secondary outer brushing surface 630 may be provided with openings for bristles 1110 similar to those, and in addition to those 620, provided on the first brushing surface 130.

Further, while the bristles 160 shown in FIG. 1 and the openings for bristles shown in FIG. 6 are shown as perpendicular to the surface 130 of the first outer brushing surface 130, the bristle openings 620, 1110 of the brush 1100 of FIG. 11 is instead angled relative the first and second outer brushing surfaces 130, 630. The openings 620, 1110 of the brush 1100 are instead parallel to the grooves 140, 640 in the brush 1100 so that they face straight downward during use.

Figure 16:
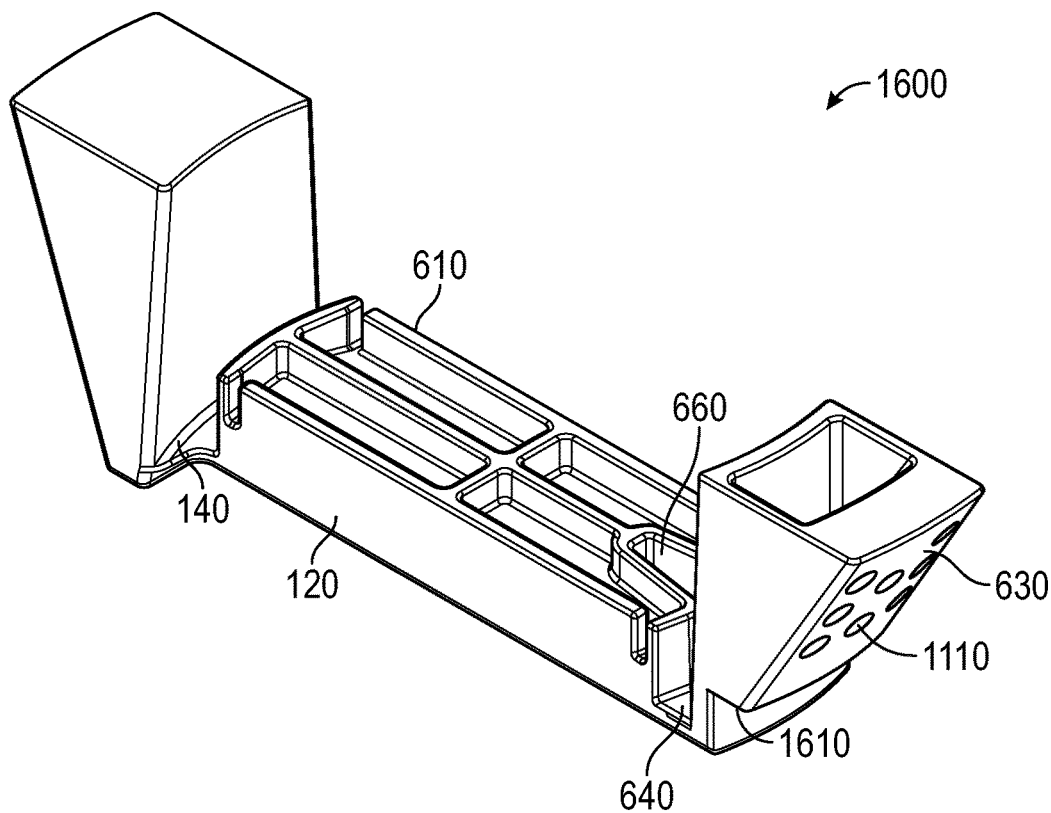
FIG. 16 shows an upper perspective view of a fourth embodiment of a brush in accordance with this disclosure.
Figure 17:
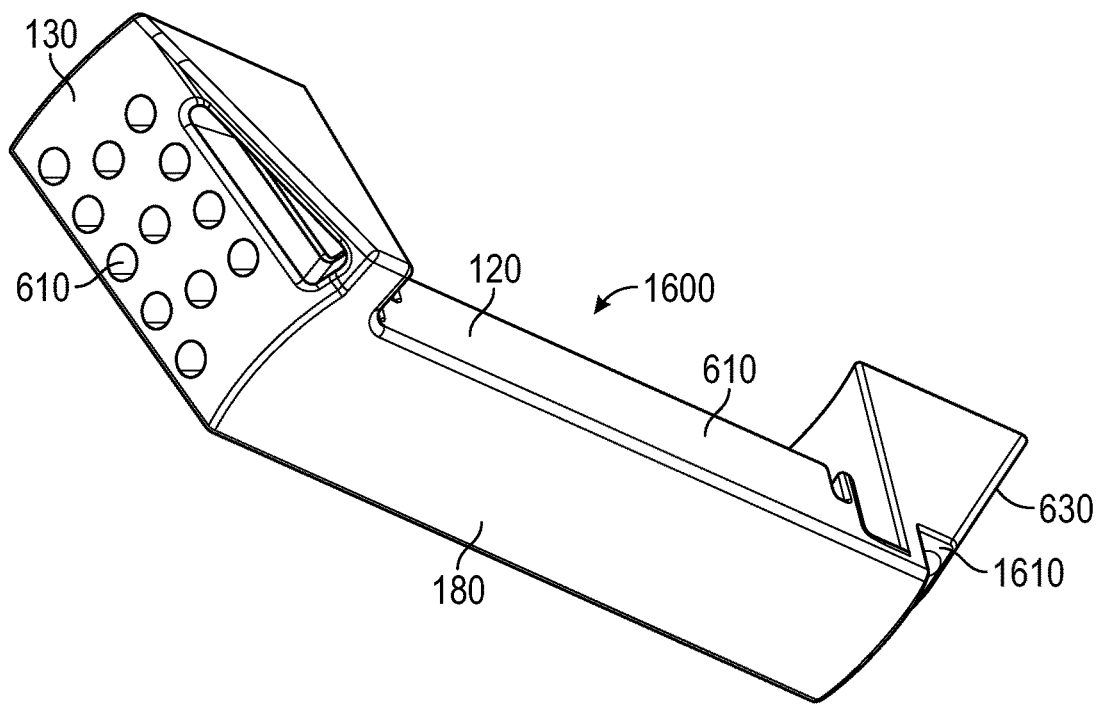
FIG. 17 shows a lower perspective view of the brush of FIG. 16.
Figure 18:
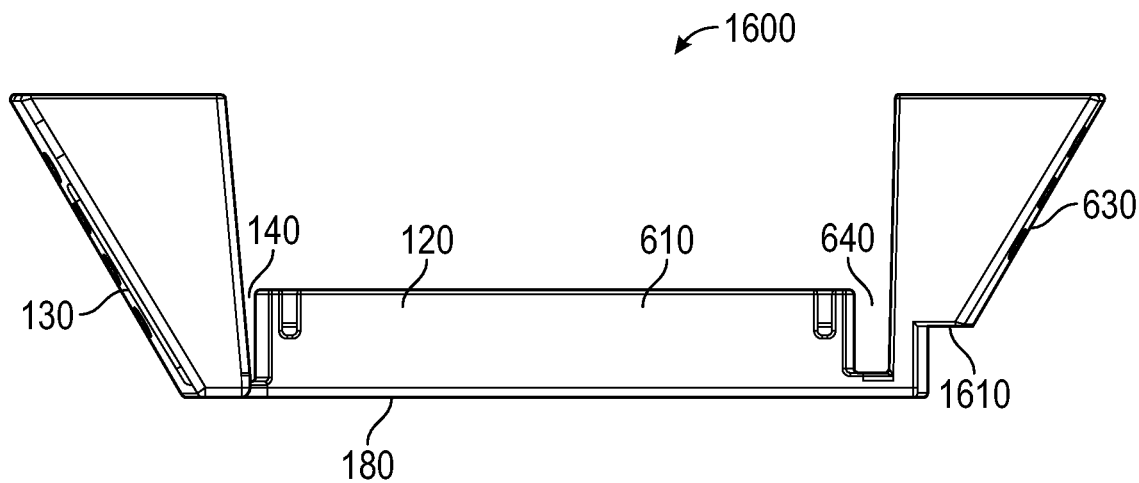
FIG. 18 shows a side view of the brush of FIG. 16.
Figure 19:
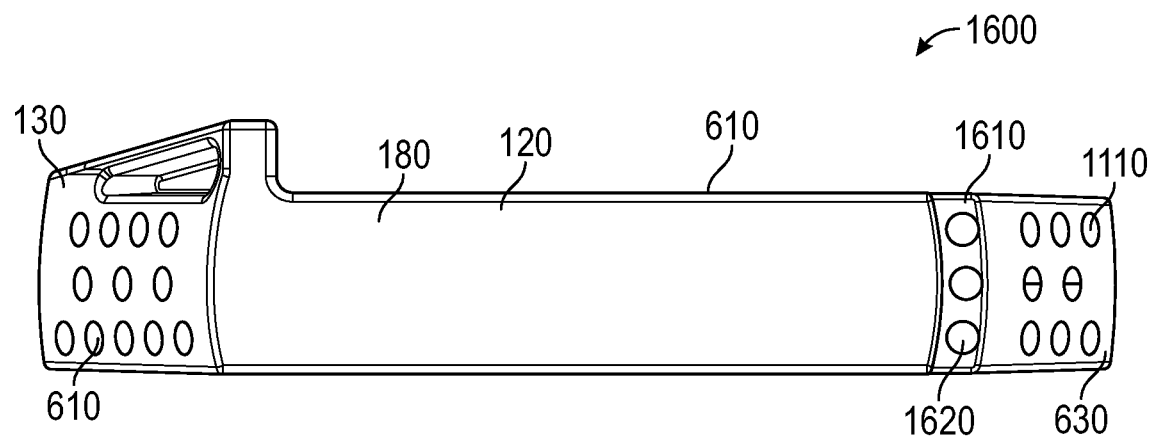
FIG. 19 shows a bottom view of the brush of FIG. 16.

FIG. 16 shows an upper perspective view of a fourth embodiment of a brush 1600 in accordance with this disclosure. FIG. 17 shows a lower perspective view of the brush 1600 of FIG. 16. FIG. 18 shows a side view of the brush 1600 of FIG. 16. FIG. 19 shows a bottom view of the brush 1600 of FIG. 16.

As noted above with respect to the brush 1100 of FIG. 11, the brush 1600 is also similar to the other embodiments shown, but provides a few distinct features. As shown, the brush 1600 provides a secondary horizontal base surface 1610. Such a base surface is above the lower surface 180 of the horizontal base component 120 of the brush body 610 and may be adjacent the first or secondary outer brushing surface 130, 630.

In addition to incorporating bristles 160, or bristle openings 620, into the first or second outer brushing surface 130, 630, the secondary horizontal base surface 1610 may be provided with additional bristles or bristle openings 1620. As shown, the secondary horizontal base surface 1610 may form a step between the lower surface 180 and the first or secondary outer brushing surface 130, 630.

During use, the brush 100, 600, 1100, 1600 is used by first removing a cover from a juicer chamber of the juicer 300, 1010. The juicer cover includes the substantially cylindrical vertical chute 350, 1020 and the juicer chamber includes the bowl 310 with the substantially circular flat bottom 320 and mesh walls 330 defining a truncated cone.

The brush 100, 600, 1100, 1600 to be used is then provided, with the brush taking the form discussed above. One or both of the groove 140 and the secondary groove 640 are then mated to the vertical chute 350, 1020 by locating an end 360, 1040 of the vertical chute at least partially within the corresponding groove or grooves. In embodiments including a notch 660, the notch is aligned with a protrusion 1030 of the end 360, 1040 of the vertical chute 350, 1020 when the end is being located within the groove 140, 640.

The vertical chute 350, 1020 may then be located so that it shares a vertical axis 500, 1000 with the mesh walls 330 of the bowl 310. This may be by fixing the juicer cover relative to the juicer chamber in order to reassembly the juicer 300, 1010.

Once the juicer 300, 1010 is fully assembled with the brush 100, 600, 1100, 1600 properly inserted, a cleaning routine may be executed during which the bowl 310 is rotated relative to the vertical chute 350, 1020 and the brush. Typically, during this part of the process, a fluid, such as water is poured into the vertical chute 350, 1020 in order to lubricate the cleaning process.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A brush comprising:
    a brush body having a horizontal base component and a first outer brushing surface angled relative to the horizontal base component, wherein the horizontal base component extends laterally from the first outer brushing surface;
    a groove in an upper surface of the brush body, the groove arranged perpendicular to the horizontal base component, and wherein the groove is located at a transition between the horizontal base component and the first outer brushing surface; and
    a plurality of bristles extending from the first outer brushing surface,
    wherein the groove forms an arc, and wherein the first outer brushing surface defines a segment of a surface of a truncated cone, wherein the truncated cone and the arc are centered about an identical central axis,
    wherein the brush further comprises a secondary outer brushing surface opposite the first outer brushing surface across the horizontal base component, wherein the secondary outer brushing surface defines a second segment of the surface of the truncated cone, and
wherein the brush further comprises a secondary groove perpendicular to the horizontal base component and located at a transition between the horizontal base component and the secondary outer brushing surface, wherein the secondary groove forms a secondary arc centered about the central axis.

2. The brush of claim 1 further comprising a notch extending from one of the groove or the secondary groove towards the horizontal base component.

3. The brush of claim 1 further comprising a notch extending from the groove in the direction of the horizontal base component.

4. The brush of claim 1 further comprising a plurality of bristles extending from a bottom surface of the horizontal base component.

5. The brush of claim 1, wherein the bristles extend from the first outer brushing surface in a direction perpendicular to the first outer brushing surface.

6. The brush of claim 1, wherein the bristles extend from the first outer brushing surface in a direction parallel to the groove.

7. A brush comprising:
a brush body having a horizontal base component and a first outer brushing surface angled relative to the horizontal base component, wherein the horizontal base component extends laterally from the first outer brushing surface;
a groove in an upper surface of the brush body, the groove arranged perpendicular to the horizontal base component, and wherein the groove is located at a transition between the horizontal base component and the first outer brushing surface;
a plurality of bristles extending from the first outer brushing surface;
a secondary horizontal base surface located above a lower surface of the horizontal base component and adjacent the first outer brushing surface, and
a plurality of bristles extending from the secondary horizontal base surface.

8. A juicer comprising:
a bowl having a substantially circular flat bottom and mesh walls defining a truncated cone extending from the flat bottom;
a blade located at the flat bottom of the bowl;
a substantially cylindrical vertical chute terminating above the blade; and
a removable brush, the brush having:
a brush body having a horizontal base component and a first outer brushing surface angled relative to the horizontal base component, where the horizontal base component extends laterally from the first outer brushing surface and has a slope angle substantially identical to a slope angle of the mesh walls;
a groove in an upper surface of the brush body, the groove arranged perpendicular to the horizontal base component and forming an arc of a circle having a circumference substantially identical to that of an end of the vertical chute, such that the end of the vertical chute mates with the arc, and wherein the groove is located at a transition between the horizontal base component and the first outer brushing surface; and
a plurality of bristles extending from the first outer brushing surface;
wherein the bowl rotates relative to the vertical chute.

9. The juicer of claim 8, wherein the first outer brushing surface defines a segment of a surface of a truncated cone, and wherein the truncated cone of the first outer brushing surface, the truncated cone of the mesh walls of the bowl, and the circumference of the end of the vertical chute are centered about a single central axis when the removable brush is mated with the vertical chute.

10. The juicer of claim 9, wherein the removable brush further comprises a secondary outer brushing surface opposite the first outer brushing surface, and wherein the secondary outer brushing surface defines a second segment of the surface of the truncated cone of the first outer brushing surface.

11. The juicer of claim 10, wherein the brush further comprises a secondary groove perpendicular to the horizontal base component and located at the transition between the horizontal base component and the secondary outer brushing surface, wherein the secondary
groove forms a secondary arc centered about the single central axis and mates with the end of the vertical chute.

12. The juicer of claim 8, wherein the brush further comprises a notch extending from the groove towards the horizontal base component, and wherein the end of the vertical chute comprises a protrusion extending from the circumference of the end of the vertical chute, wherein the protrusion mates with the notch when the brush is mated with the end of the vertical chute.

13. The juicer of claim 8, wherein the brush further comprises a plurality of bristles extending from a bottom surface of the horizontal base component.

14. The juicer of claim 8, wherein the brush further comprises:
a secondary horizontal base surface located above a lower surface of the horizontal base component and adjacent the first outer brushing surface, and
a plurality of bristles extending from the secondary horizontal base surface.

15. The juicer of claim 8, wherein the bristles extend from the first outer brushing surface in a direction perpendicular to the first outer brushing surface.

16. The juicer of claim 8, wherein the bristles extend from the first outer brushing surface in a direction parallel to the groove.

17. A method for cleaning a juicer, the method comprising:
removing a juicer cover from a juicer chamber, the juicer cover comprising a substantially cylindrical vertical chute and the juicer chamber comprising a bowl having a substantially circular flat bottom and mesh walls defining a bowl truncated cone extending from the flat bottom;
providing a removable brush, the removable brush having:
a brush body having a horizontal base component and a first outer brushing surface angled relative to the horizontal base component, wherein the horizontal base component extends laterally from the first outer brushing surface;
a groove in an upper surface of the brush body, the groove arranged perpendicular to the horizontal base component and forming an arc of a circle having a circumference substantially identical to that of an end of the vertical chute; and
a notch extending from the groove towards the horizontal base component;

wherein the first outer brushing surface defines a segment of a brush truncated cone, wherein the brush truncated cone and the arc are centered about an identical central axis, wherein the brush further comprises a secondary outer brushing surface opposite the first outer brushing surface across the horizontal base component, wherein the secondary outer brushing surface defines a second segment of the surface of the brush truncated cone, and wherein the brush further comprises a secondary groove perpendicular to the horizontal base component and located at a transition between the horizontal base component and the secondary outer brushing surface, wherein the secondary groove forms a secondary arc centered about the central axis mating the groove to the vertical chute by locating the end of the vertical chute at least partially within the groove and aligning the notch with a protrusion from the circumference of the end of the vertical chute;

locating the vertical chute such that it shares a vertical axis with the mesh walls of the bowl and fixing the juicer cover relative to the juicer chamber; and pouring a fluid into the vertical chute while rotating the bowl relative to the vertical chute.

* * * * *